United States Patent [19]

Kramer

[11] Patent Number: 4,768,761
[45] Date of Patent: Sep. 6, 1988

[54] RUBBER-PLASTIC COMPOSITE

[75] Inventor: James H. Kramer, Akron, Ohio

[73] Assignee: The B. F. Goodrich Company, Akron, Ohio

[21] Appl. No.: 794,896

[22] Filed: Nov. 4, 1985

Related U.S. Application Data

[62] Division of Ser. No. 592,031, Mar. 21, 1984, Pat. No. 4,585,215.

[51] Int. Cl.$^4$ .............................................. F16F 1/48
[52] U.S. Cl. .................................... 267/154; 267/279
[58] Field of Search ............... 188/268; 267/154, 273, 267/276, 279, 281, 141, 141.2

[56] References Cited

U.S. PATENT DOCUMENTS

| | | |
|---|---|---|
| 2,689,755 | 9/1954 | Krotz . |
| 3,006,627 | 10/1961 | Paulsen .......................... 267/154 X |
| 3,110,553 | 11/1963 | Kniffin, Jr. . |
| 3,336,021 | 8/1967 | Kramer ............................. 267/154 |
| 3,545,737 | 12/1970 | Lamprey et al. ................... 267/141 |
| 3,608,049 | 9/1971 | Travella . |
| 3,647,589 | 3/1972 | Felden . |
| 3,847,260 | 11/1974 | Fowler . |
| 4,035,534 | 7/1977 | Nyberg . |
| 4,245,674 | 1/1981 | Nakamura . |
| 4,322,062 | 3/1982 | Aleck ............................... 267/154 |

Primary Examiner—Duane A. Reger
Attorney, Agent, or Firm—Joseph Januszkiewicz

[57] ABSTRACT

A rubber plastic composite cylinder that has a cylindrical hollow elastomeric body bonded internally to a shaft and its external surface bonded to a cylindrical sleeve of ultra high molecular weight polyethylene which includes the bonding as by vulcanization two outer shells of ultra-high molecular weight polyethylene to the elastomeric cylinder to place the elastomeric cylinder in compression. Such composite cylinder may be spaced along a shaft or utilized effectively as a coaxial shear spring or as conveyor rollers.

5 Claims, 3 Drawing Sheets

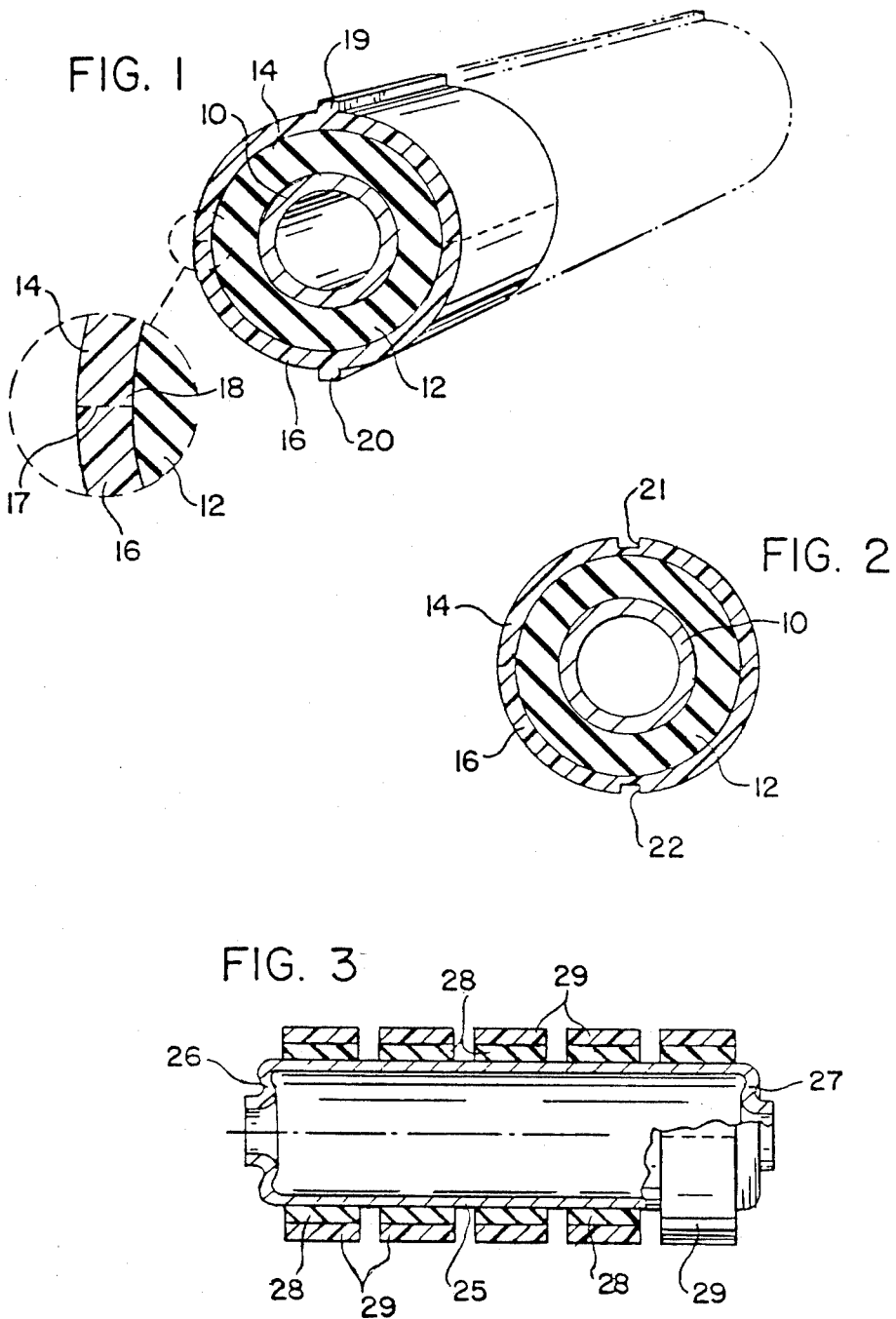

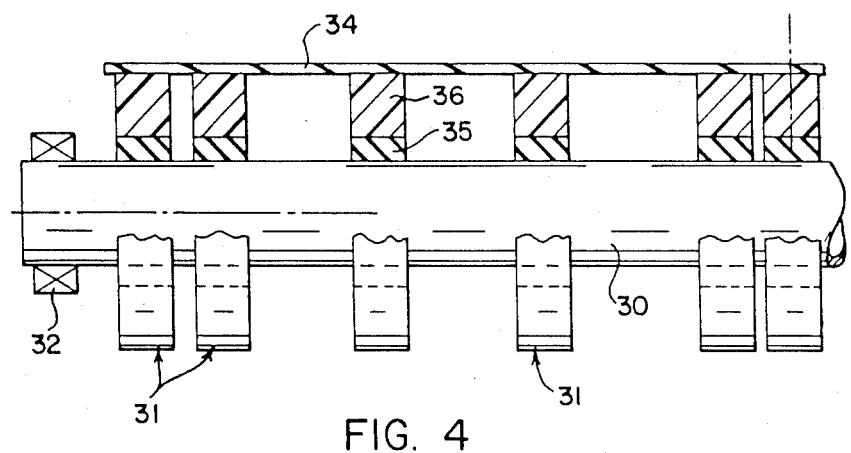
FIG. 4
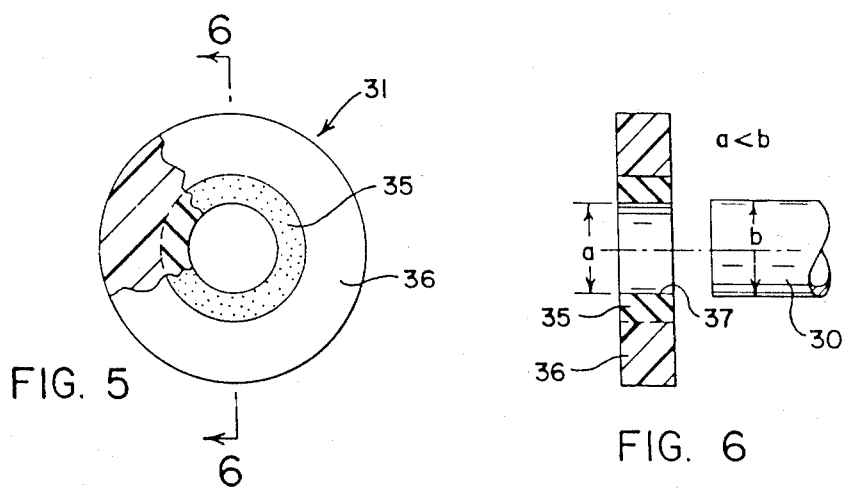
FIG. 5
FIG. 6

RUBBER-PLASTIC COMPOSITE

This is a division, of application Ser. No. 06/592,031, filed Mar. 21, 1984 now U.S. Pat. No. 4,585,215.

BACKGROUND OF THE INVENTION

This invention relates to rubber springs utilizing cylinders and rollers made of rubber and plastic composites which are composed of a generally cylindrical body of rubber in compression that surrounds a metal sleeve while its exterior surface is connected to an outer plastic shell that holds such rubber in compression.

In the vulcanization of rubber of cylindrical torsion and linear shear springs, the rubber takes its approximate final shape at the high temperature required for vulcanization and then contracts on cooling. In order to minimize tension on the external shell of a torsion spring it has been the practice to form the shell in halves and then to move the two halves of the shell toward one another in the mounting or have the two shell halves split but mounted on the rubber cylinder and have the split between the halves filled with the molded rubber. These methods seek to eliminate tension in the rubber. By filling the gap between the two halves with the molded rubber some of the concentration of stress at the gap is eliminated.

The present invention eliminates the stress in an unusual manner while simultaneously insuring a superior and stronger product. The outer shell halves are made of ultra high molecular weight polyethylene which produces a marked thermal shrinkage between the outer shell halves and the intermediately located rubber molded sleeve such that the outer shell halves fuse at their mating ends to form a perfectly round shell onto a perfectly round rubber cylinder applying desirable compressive forces upon the rubber which is achieved by the vulcanization process and places the rubber in compression in the finished product. In this manner the thermal stresses within the rubber are relieved and introduces compressive forces within the rubber which is desirable in that it provides good flex life in the rubber. Prior to this assembly, the typical arrangement of the outer shell halves as discussed above had the centers of the shell radius spaced apart from the center of the inner shaft or the center of the rubber cylinder wherein reliance was made on the fact that on shrinkage of the rubber cylinder, the spaced centers of the two outer shell halves would move relatively close to the center of the rubber cylinder. With the present use of the ultra high molecular weight materials for the outer shell halves, it is the shrinkage of the shell halves in cooperation with the shrinkage of the rubber cylinder that provides a common center point or line in a more facile manner due to their inherent shrinkage rates while introducing desirable compressive forces within the rubber. In addition to these desirable features of using this combination, the outer shell can be machined to closer tolerances. Further, if necessary to provide a friction fit, the entire curved assembly can be cooled to a very low temperature and thence inserted into the bore of an outer housing such that with the resulting expansion on warming up to ambient temperature of the torsion spring assembly an excellent friction fit is obtained. In a similar manner the present invention provides a facile means for manufacturing idler rollers which are particularly economical and simple to manufacture yet exhibiting the qualities of abrasion and wear resistance. These qualities are combined with the ability of the idler rollers to withstand shock loading. The present invention further utilizes the properties of this invention in a shear spring by applying the compressive forces of the shrinking outer ultra high molecular weight polyethylene shell or ring which is bonded to a rubber ring which in turn is bonded to a metal sleeve. The coefficient of thermal expansion of the ultra high molecular weight polyethylene is approximately 3.6 times the amount of shrinkage of the rubber ring, thus providing a great compressive force on the rubber to achieve a good flex life in its action as an axial shear spring. The interaction of the shrinkage of the ultra high molecular weight polyethylene provides a significant contribution to this shear spring combination.

SUMMARY OF THE INVENTION

An elastomeric plastic composite such as a shear spring member, torsion member, idler roller or pulley utilize a cylindrical hollow body or sleeve of an elastomer and bond the internal surface thereof to a shaft. The outer surface of the cylindrical elastomeric body is also chemically bonded to an annular sleeve or shell of ultra high molecular weight polyethylene wherein the shell is cured simultaneously with the elastomeric sleeve to form an integral bonded unit on the shaft or sleeve while putting the rubber under high compressive forces. The outer shell and the elastomeric sleeves may be molded as axially spaced integral separate units bonded to a common shaft.

BRIEF DESCRIPTION OF THE DRAWINGS

FIG. 1 is an isometric view of a torsion spring assembly with a forward portion thereof shown in cross section.

FIG. 2 is a cross-sectional view of a modified form of the torsion spring assembly shown in FIG. 1.

FIG. 3 is a longitudinal cross-sectional view of a modified form of the invention.

FIG. 4 is a modified form of an idler roller showing a portion thereof in cross-section.

FIG. 5 is a side elevational view of a roller showing a portion thereof in cross-section.

FIG. 6 is a cross-sectional view of the roller shown in FIG. 5 taken on line 5—5 thereof.

DETAILED DESCRIPTION

Figure 7:
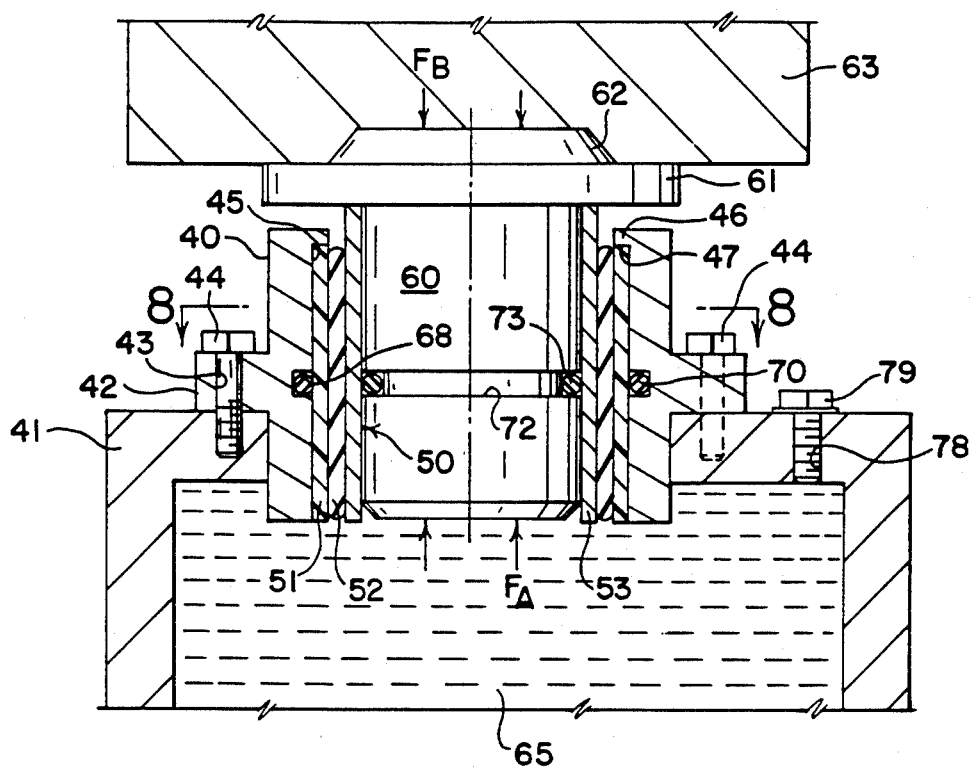
FIG. 7 is a further modified form of the invention showing in axial shear spring in a cross-sectional view.

Referring to the drawings, wherein like reference numerals designate like or corresponding parts throughout the several views, there is shown in FIG. 1 a hollow cylindrical shaft 10 (with an axial center line) made of a suitable metal such as aluminum, steel or brass. A rubber sleeve 12, which is the spring element, is molded and vulcanized in the usual way in the space between the shaft 10 and a pair of shell halves 14 and 16 that encompass the sleeve 12. The sleeve 12 is bonded to the exterior surface of the shaft 10. The shell halves 14 and 16 are formed from an ultra high molecular weight polyethylene having molecular weights from 500,000 to approximately six million. Such material has excellent wear properties including high impact strength, high breaking strength, and high bending strength.

The rubber sleeve 12 used as the torsion spring member may be an elastomer, an elastomer is defined as a substance that can be stretched at room tempeatures to at least twice its original length and, returns with force to approximately its original length in a short time. (See Glossary of Terms as prepared by ASTM Committee D11 on Rubber and Rubberlike Materials. Published by the American Society for Testing Materials).

The elastomeric or rubber material that can be used in constructing the torsion spring 12 can be any of the well known elastomers including for example natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluocarbon rubbers, fluroisilicone rubbers, silicone rubbers, chlorosulfonated polyethylene, polyacrylates, polybutadiene, polychloroprene and the like.

Each of the half shells 14 and 16 has its respective mating edges 17 and 18 fused during the curing process such that the edges are not distinguishable and the shells 14 and 16 are a single homogeneous shell as a result of the curing of the rubber sleeve 12. With the shell halves 14 & 16 made of ultra high molecular weight polyethylene material, there is a greater shrinkage of the shell relative to the rubber sleeve 12 since the coefficient of thermal expansion of the ultra high molecular weight polyethylene is approximately 3.6 times the amount of shrinkage of the rubber ring 12, thus providing a substantial compressive force on the rubber to achieve a good flex life in the rubber. In this action the outer surface of the elastomeric sleeve 12 is chemically bonded to the outer shell. During the molding and curing operation of the outer shell 14 and 16, a pair of diametrically opposed keys 19 and 20 are formed on the outer periphery of the shell to provide a convenient means for connecting the rubber torsion spring to an external operating member. During the curing of the ultra high molecular weight outer shell and the subsequent cooling sufficient compressive forces are exerted upon the rubber sleeve 12 to relieve the thermal stresses in the rubber while leaving sufficient residual compressive forces on the rubber which are desirable to give good flex life in the rubber. The center line of such outer shells 14 and 16 along with rubber sleeve 12 which is annular in shape have a common axis that is coincident with the axial center line of shaft 10 as seen in FIGS. 1 and 2. As seen in FIG. 1, the outer shell (14-16) and the cylindrical hollow rubber body or rubber sleeve 12 is an elongated longitudinally extending member having an axial length that is substantially greater than the radial thickness of such hollow rubber body or rubber sleeve 12. The length of the cylindrical hollow rubber body 12, shaft 10, and the outer shell (14-16) also referred to as the cylindrical polyethylene sleeve are all of the same length.

A modification of the torsion spring assembly is shown in FIG. 2 wherein a pair of diametrically opposed keyways 21 and 22 are formed into the outer shell (14-16). In lieu of molding the keyways into the outer shell, the keyways 21 and 22 may be machined therein. In addition, the entire outer shell may be machined to make its center concentric with that of the hollow cylindrical shaft 10 (which may be a solid shaft rather than a hollow shaft). Another advantage of the use of the combination of the ultra high molecular weight outer shell and rubber sleeve 12 is that upon heating up the outer shell to approximately 250° the ultra high molecular weight shell will expand and pull the rubber sleeve 12 with it to increase the inside diameter to permit its insertion onto a shaft such as 10 in a facile manner.

A further modification of the invention is shown in FIG. 3 wherein a hollow cylinder or sleeve 25 has hubs 26 and 27 formed on the respective ends thereof to provide means for mounting such sleeve 25 onto a shaft for use as a conveyor idler roller. The hollow cylindrical shaft 25 is made from a suitable metal such as aluminum, steel or brass. A plurality of laterally spaced annular rubber rings 28 are suitably mounted on the sleeve 25. Thence a plurality of annular sleeves 29 of ultra high molecular weight polyethylene are secured onto the respective rubber rings 28. Preferably the ultra high molecular weight sleeve 29 and the rubber rings 28 are molded and cured as a unitary article such as to provide a compressive force to the rings 28 and then the integral sleeve and ring are slipped into position on the hollow metal sleeve 25 by shrinkfitting thereon as described above.

A further modification of the invention is shown in FIG. 4 wherein a hollow cylindrical shaft 30 has a plurality of laterally spaced rollers 31 mounted thereon. The respective end portions of shaft 30 have bearings 32 (only one shown in FIG. 4) mounted thereon to facilitate the rotation of such roller unit. A conveyor belt 34 is shown as supported by rollers 31. Each roller 31 has an inner elastomeric sleeve 35 and an outer sleeve 36 made of a high molecular weight polyethylene material. In constructing such bearing assembly, the outer sleeve 36 is heated and after an expansion thereof, such sleeve 36 is slid over onto the inner elastomeric sleeve 35. The diameter of bore 37 of inner sleeve 35 is smaller than the diameter of shaft 30. To assemble the bearing assembly as shown in FIG. 4, the roller 31 is heated, thereby expanding the outer sleeve 36 and the inner sleeve 35 to where the bore 37 of the inner sleeve 35 is larger than the diameter of shaft 30, permitting the placement of respective rollers 31 onto shaft 30. Preferably two or more rollers are placed at the central portion of the shaft 30 and two or more rollers 31 are placed adjacent to the outer edges of the shaft 30 while single rollers are spaced therebetween.

Since the outer sleeve 36 made of ultra high molecular weight polyethylene has a coefficient of thermal expansion of $2.0 \times 10^{-4}$ cm/cm per Degree C. while rubber has a $1.80 \times 10^{-4}$ cm/cm per Degree C. then there is 1.11 times as much expansion or shrinkage of the sleeve 36 relative to the ring 35 which thereby places the rubber ring in a high degree of compression which prolongs the life of the torsion characteristic of the pulley.

Figure 8:
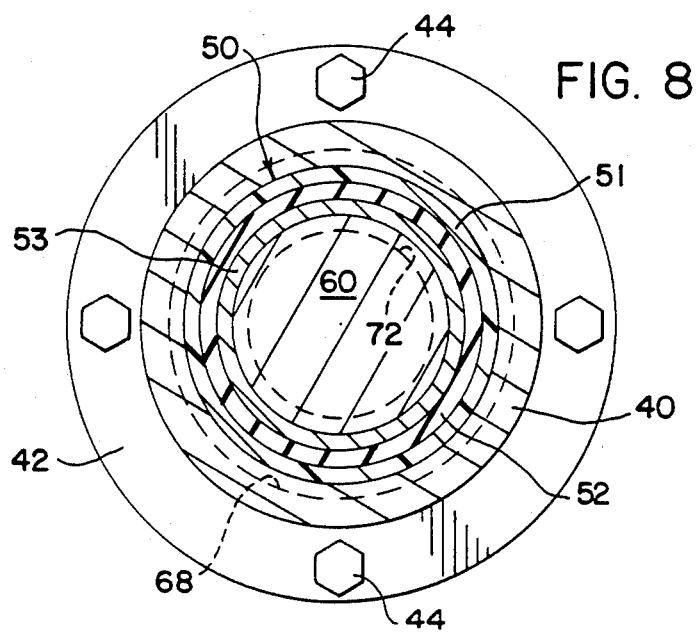
FIG. 8 is a cross-sectional view of the shear spring taken on line 8—8 of FIG. 7.

A further modification of the invention is shown in FIGS. 7 and 8 wherein a flanged cylindrical metal sleeve or housing 40 is shown as rigidly connected as to a support 41. The housing 40 has a flange 42 with a plurality of bolt holes 43 receiving bolts 44 to secure such housing to the support 41. Housing 40 has an interior bore 45 and an upper cylindrical rim 46 providing a shoulder 47. Suitably received by the bore 45 of housing 40 is an axial shear spring assembly 50. Spring assembly 50 has an outer shell or sleeve 51 of ultra high molecular weight polyethylene material having a molecular weight from 500,000 to approximately six million. The sleeve 51 is suitably bonded or fused to an annular elastomeric ring 52. The elastomeric ring 52 in turn is bonded to a metal cylinder or sleeve 53. In assembling such axial shear spring, the elastomeric ring 52 is compressed to as high a compressive force as possible to enhance the properties of such spring. This is achieved by molding and curing (vulcanization in the case of rubber) the ultra high molecular weight polyethylene sleeve 51 and the elastomeric ring 52 at a temperature of 290° to 360° F. (143° C. to 182° C.) with the outside diameter of the sleeve 51 being considerably greater than the bore 45 of the housing. As the molded spring assembly 50 cools from the curing temperature to ambient temperature, the ultra high molecular weight polyethylene (UHMWP) sleeve 51 shrinks at a greater rate than the elastomeric ring 52 resulting in compressing the elastomeric ring 52. As an example of the shrinkage, using a UHMWP material with a coefficient of thermal expansion of $2.0 \times 10^{-4}$ cm/cm per Degree C. as compared to a rubber ring 52 having a coefficient of thermal expansion of $1.8 \times 10^{-4}$ cm/cm per Degree Centigrade provides a 1.11 times shrinkage of the rubber ring 52 thus exhibiting a high degree of compression. This compression can be further increased by having the outside diameter of the spring assembly slightly greater than the diameter of bore 45 at ambient or room temperature, thence cooling the entire assembly 50 which thereby further shrinks the UHMWP sleeve 51 to fit bore 45 which further compresses the rubber, bearing in mind that the sleeve 51 shrinks at a greater rate than the rubber ring 52. The spring assembly 50 is now fully received within the housing 40. After assembling the spring, it must also be bore in mind that as the bearing assembly 50 operates, it will warm up and that the compression of the rubber will be greater as the rubber expands, while being prevented from radial inward movement by the metal sleeve 53 which is frictional received by a cylindrical plug 60 having a cap 61. Cap 61 has a projection 62 which is received by a support 63 which is the downward variable force that exerts a shear load on the shear spring assembly 50. The bottom of the plug 60 bears against a fluid 65, which is captively held in the cylindrical reservoir of support 41. Thus the variable force from support 63 which may be in the form of a vibratory force is also resisted by the fluid in reservoir 65 via the spring assembly 50. The cap 61 is in abutting contact with the metal sleeve 53 which in turn exerts a shearing force on the compressed elastomeric ring 52 that is bonded to UHMWP shell 51. The upper annular edge of shell 51 is in abutting contact with the shoulder on sleeve 40. Sleeve 40 has an annular recess 68 on its inner bore 45 receiving an O-ring 70, which O-ring frictionally engages the outer surface of shell 51. The cylindrical plug 60 has an annular recess 72 on its outer periphery receiving an O-ring 73. As the vibratory force or force $F_B$ is exerted on the cap 61, such force is resisted by the fluid force $F_A$. The fluid is sealed within the fluid reservoir 65 by the pair of O-rings 70 and 73 such that the spring assembly 50 is allowed to compensate for the differential in movement of support 63. Where force $F_A$ exceeds force $F_B$ then shell 51 will have its upper edge abut the shoulder 47 of cylindrical rim 46. The compressed elastomeric ring 52 is placed in shear while metal ring 53 abuts the cap 61 and resists the forces $F_B$. Such ring 42 is able to withstand shearing stresses as high as 400 psi or 276 Newton/cm².

A further modification of the invention is to provide a threaded bore 78 in support 41 with a plug 79 such that the reservoir 65 may be drained of the fluid therein and a different fluid may be introduced therein. Such fluid may be a liquid or a gas with the further selection of pressurizing such liquid or gas. In addition such plug 79 may be removed and the reservoir 65 connected to atmosphere. Accordingly the shear spring assembly 50 can be assisted in its operation or allowed to operate under its own resistance or support.

It will be apparent that, although a specific embodiment and certain modifications of the invention has been described in detail, the invention is not limited to the specifically illustrated and described constructions since variations may be made without departing from the principles of the invention.

I claim:

1. A rubber torsion spring having a relatively thick annular body of rubber in compression having an inner and outer peripheral surface, a shaft with an outer surface bonded to said inner surface of said annular rubber body, a relatively thick cylindrical sleeve of ultra high molecular weight polyethylene having an inner cylindrical surface fixedly secured to said outer peripheral surface of said rubber annular body and holding said rubber body in compression, the axial center line of said annular rubber body and said cylindrical sleeve of polyethylene being coincident, and said cylindrical sleeve of polyethylene has keyway means for connection to another member.

2. A rubber torsion spring having a relatively thick annular body of rubber in compression having an inner and outer peripheral surface, a shaft with an outer surface bonded to said inner surface of said annular rubber body, a relatively thick cylindrical sleeve of ultra high molecular weight polyethylene having an inner cylindrical surface fixedly secured to said outer peripheral surface of said rubber annular body and holding said rubber body in compression, the axial center line of said annular rubber body and said cylindrical sleeve of polyethylene being coincident, said cylindrical sleeve of polyethylene has keyway means for connection to another member, and said cylindrical sleeve has a shrinkage of greater than three times said annular body of rubber to provide said compressed state of said rubber.

3. A rubber torsion spring as set forth in claim 2 wherein said cylindrical hollow body of rubber has its outer peripheral surface chemically bonded to said inner cylindrical surface of said cylindrical sleeve of polyethylene.

4. A rubber torsion spring as set forth in claim 3 wherein said cylindrical rubber body is an elongated longitudinally extending member having a length substantially greater than the radial thickness of said cylindrical rubber body.

5. A rubber torsion spring as set forth in claim 3 wherein said cylindrical hollow rubber body, said shaft and said cylindrical sleeve of polyethylene are all of the same length.

* * * * *